Dec. 27, 1966  C. A. MARTIN-VEGUE, JR., ET AL  3,294,023
AUTOMATIC MOTOR CONTROLLER
Filed May 31, 1963  3 Sheets-Sheet 1
FIG.1
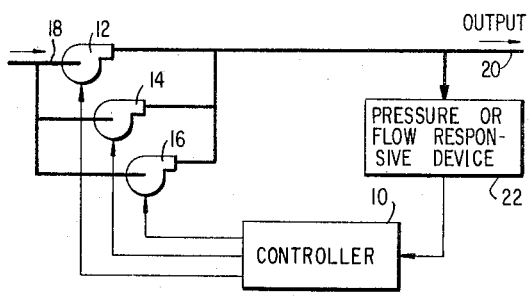
FIG.3
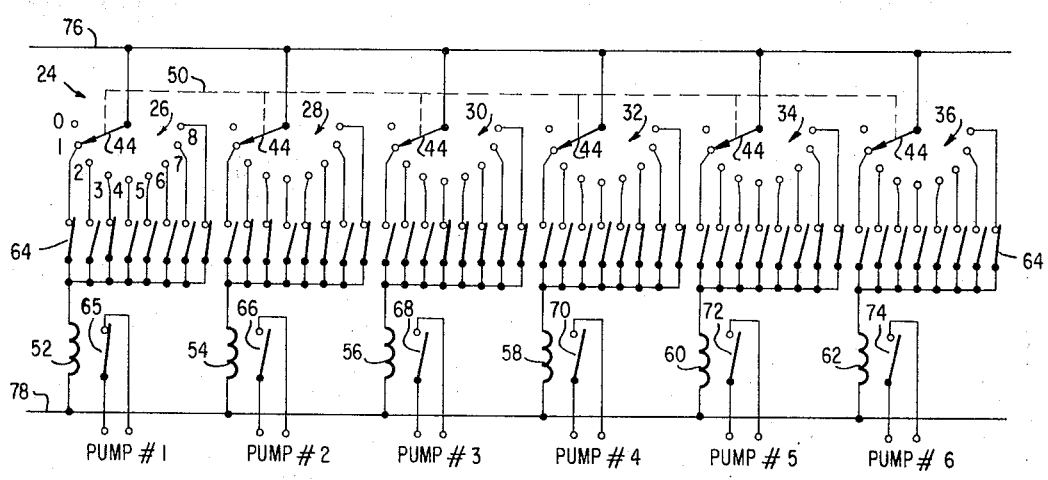
FIG.2
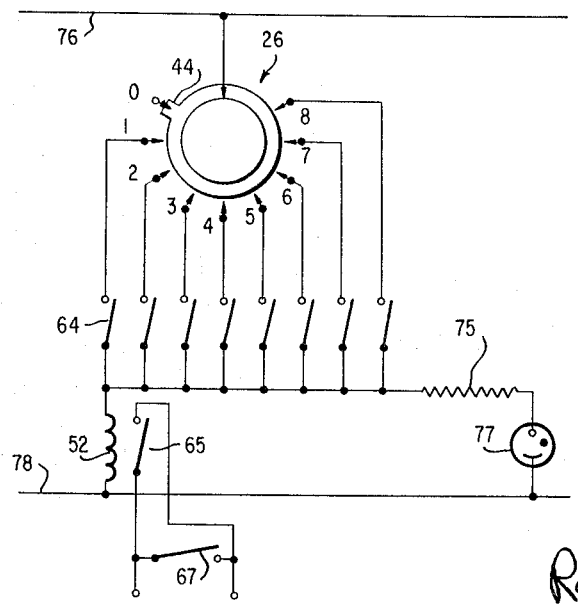
FIG.5
INVENTORS
CHARLES A. MARTIN-VEGUE, JR.
EDWIN F. W. KELLERMANN
BY
Raphael Semmes
ATTORNEY

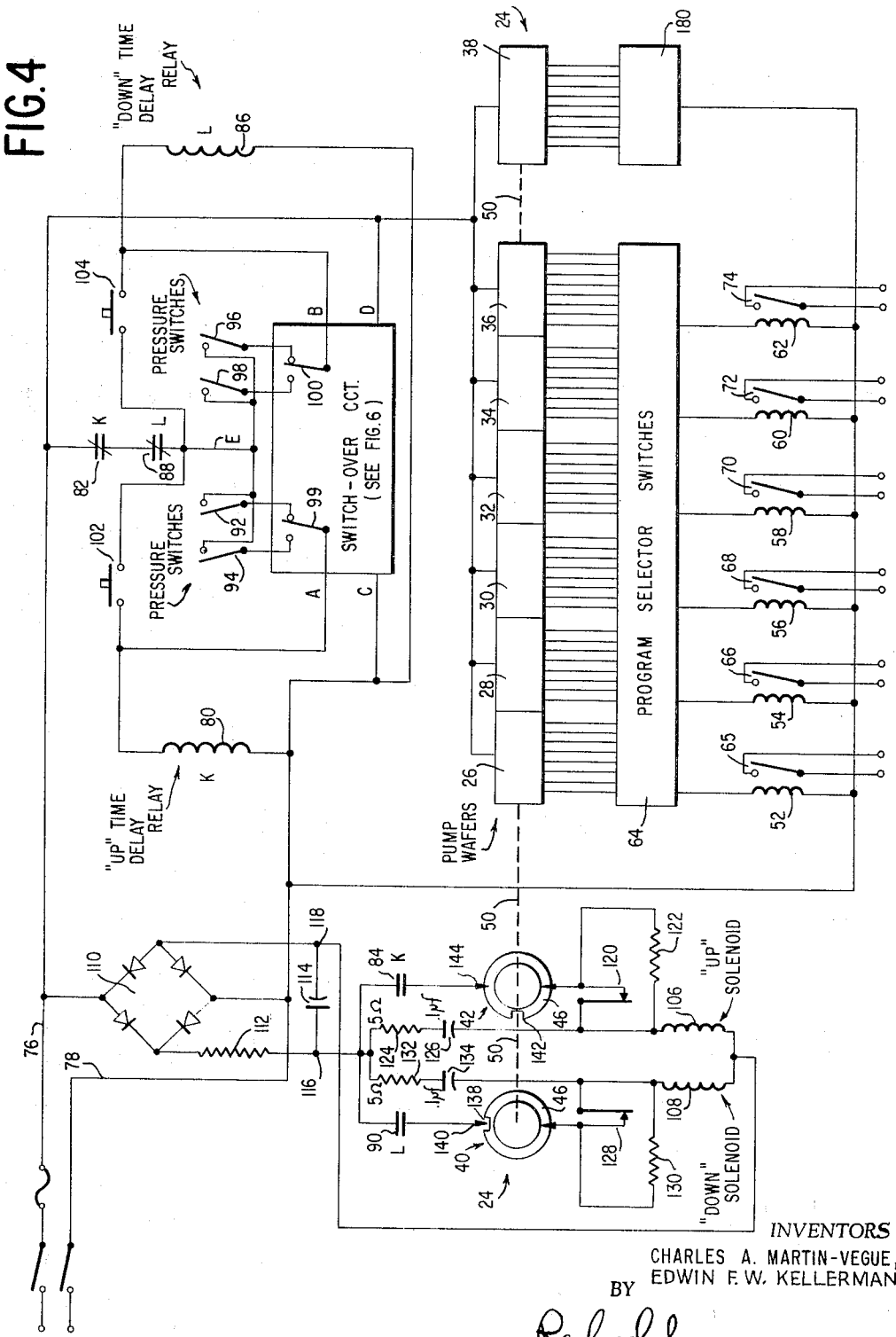

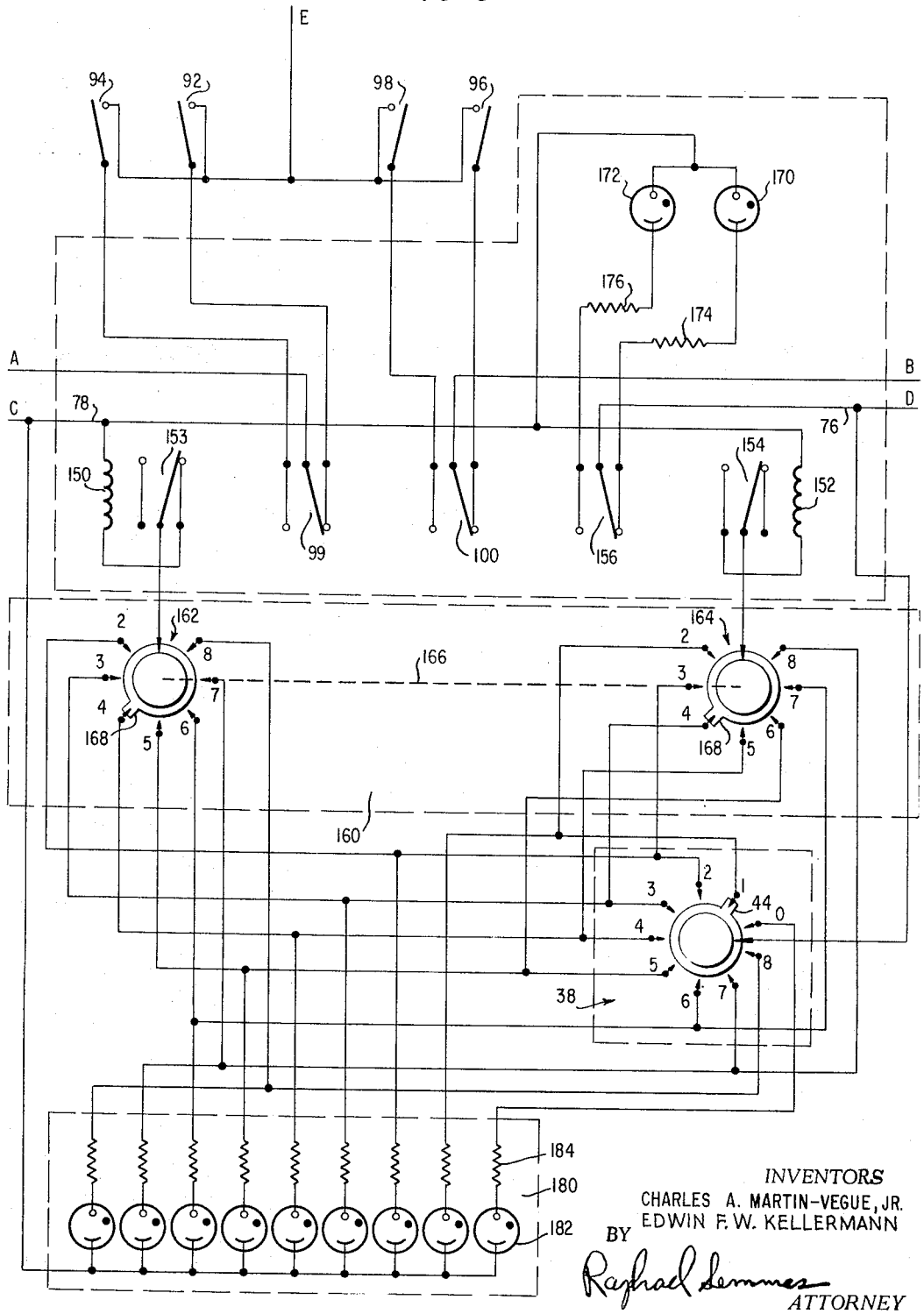

United States Patent Office 3,294,023
Patented Dec. 27, 1966

3,294,023
AUTOMATIC MOTOR CONTROLLER
Charles A. Martin-Vegue, Jr., and Edwin F. W. Kellermann, Miami, Fla., assignors to Hersey-Sparling Meter Co., El Monte, Calif., a corporation of Massachusetts
Filed May 31, 1963, Ser. No. 284,714
20 Claims. (Cl. 103—11)

This invention relates to an automatic motor controller and, more particularly, to a controller for automatically controlling in sequence and combination the energization of a plurality of pumps of different pumping capacities of a fluid pumping station.

Water pumping stations typically have a number of pumps operating in parallel to provide the necessary volume of water at the desired pressure to a water distribution system. The pumps employed in such stations usually vary in size and pumping capacity from as low as five horsepower up to one hundred or more horsepower and must be continuously turned on and off, in various combinations, to maintain the desired pressure in the system as demand varies. It is also desirable for maximum efficiency that the best combination of pumps be pumping for a given demand.

In the past, there have been a number of suggestions of systems for automatically energizing pumps of different capacities in various combinations. These prior systems have, however, tended to be quite complex and inflexible. In one prior art system, for example, the controller comprises a selective cam-switch unit which is reversely rotatable to the desired degree required, in one direction to supply increasing demand and in the other direction to reduce the supply as demand decreases. This controller is driven by a reversible control motor, which is responsive to the pressure of the system, and the cam-switches control the energization of a plurality of relays, one for each pump combination, which close contacts to time delay relays for each of the pumps to be energized. Since this prior art system makes no provision for varying the sequence and combinations of pump operation, such changes are made only with great difficulty. Systems of this type are thus greatly lacking in flexibility and become unduly complicated when more than three pumps are utilized.

It is accordingly the principal object of this invention to provide an improved automatic motor controller for controlling the energization of predetermined combinations of motors.

Another object of the invention is the provision of an improved automatic controller for controlling the energization of predetermined combinations of pumps in response to the pressure of a fluid distribution system.

An additional object is the provision of an automatic controller of this general type having improved flexibility.

It is a more specific object of this invention to provide a motor controller comprising a bi-directional rotary stepping switch having a separate switch wafer for each of several motors to be controlled and having a switch means connected between the stationary contacts of each wafer and motor energizing means for each motor.

An additional object is the provision of means for reversely rotating such a stepping switch in response to deviation of a condition of a system to be controlled beyond a set of predetermined limits.

Other objects include the provision of a motor controller of this type which requires no more than two time delay relays, which is provided with means to prevent the stepping switch from rotating beyond a preselected position in one direction and beyond a preselected position in the opposite direction, which is provided with means for indicating at which position the stepping switch is located, and which requires no more than a single set of condition limit switches to control the stepping switch.

I have discovered that it is sometimes desirable in a water pumping station to maintain the pressure of the system between higher limits at higher flow conditions so that users at the end of the line will have adequate flow. It is accordingly a further object of this invention to provide means for switching-over from a first set of limit switches to a second set of limit switches for higher flow conditions.

It is yet another object of the invention to provide means whereby the flow condition at which the switchover occurs may be easily predetermined.

The foregoing and other objects, advantages, and features of the invention and the manner in which the same are accomplished will become more readily apparent upon consideration of the following detailed description of the invention taken in conjunction with the accompanying drawings, which illustrate a preferred and exemplary embodiment, and wherein:

FIGURE 1 is a schematic diagram generally showing the relationship of an automatic controller of the invention to a plurality of pumps of a fluid pumping station;

FIGURE 2 is a schematic diagram showing the relationship between a plurality of switch wafers of a stepping switch of the invention and a plurality of pump energizing relays of the invention;

FIGURE 3 is a chart illustrating a typical switching program for use with the invention;

FIGURE 4 is a schematic diagram showing an automatic controller of the invention as a whole;

FIGURE 5 is a schematic diagram showing the circuit of one of the pump wafers of the stepping switch; and FIGURE 6 is a schematic diagram showing certain details of the automatic controller circuit of the invention.

Briefly, the invention contemplates the provision of a rotary, bi-directional stepping switch having a plurality of switch sections or wafers, one for each pump to be energized. Each of the switch wafers has a plurality of stationary switch contacts, one for each position of the stepping switch. Switch means are provided for connecting predetermined ones of the stationary switch contacts to a pump motor energizing relay associated with its respective switch wafer. In this way, predetermined combinations of pump motor energizing relays will be actuated at each position of the stepping switch. The stepping switch is rotated by a pair of solenoids, one for stepping the switch in a first direction and the other for stepping the switch in the opposite direction. A pair of time delay relays control the energization of the solenoids in response to the closing of a low pressure limit switch and a high pressure limit switch, respectively. In order to provide different pressure limits for different flow conditions, a latching relay is provided for switching-over from a first set of pressure limit switches to a second set of pressure limit switches when the stepping switch reaches a predetermined position.

FIGURE 1 illustrates the relationship of a controller 10 of the invention to the pumps of a water pumping station. While any number of pumps may be employed, for simplicity the pumping station as shown in the figure has three pumps 12, 14 and 16 which are connected in parallel between an input line 18 and an output line 20 of a fluid distribution system. A pressure or flow responsive device 22 is coupled to the output line 20 and is electrically connected to the controller 10 which will automatically energize the pumps 12, 14 and 16 in proper sequence and combination to maintain a desired pressure and flow condition in the output line 20 of the fluid distribution system.

The over-all arrangement of the controller may best be understood by reference to FIGURE 4 which shows a simplified schematic of a controller of the invention designed for controlling the energization of six pumps in eight possible predetermined combinations. The controller comprises a bi-directional, rotary stepping switch 24 which has six "pump" wafers 26, 28, 30, 32, 34 and 36, a "position" wafer 38, and a pair of "stop" wafers 40 and 42. Each of the "pump" and the "position" wafers is provided with a moving contact 44 (see FIGURES 5 and 6), and the "stop" wafers are provided with moving annular contacts 46. The contacts 44 and 46 are mounted for rotation on a common shaft 50 of the stepping switch. As the stepping switch is stepped through a plurality of positions in an "up" direction (counter-clockwise as shown in the drawings), the moving contacts 44 of the "pump" and "position" wafers are stepped successively on stationary contacts 0, 1, 2, 3, 4, 5, 6, 7 and 8 of their respective switch wafer. (For convenience, each of the switch positions will hereinafter be referred to with reference to the number of the corresponding stationary contact as position "0," position "1," position "2," position "3," etc.) Conversely, when the stepping switch is stepped in the "down" direction (clockwise as shown in the drawings), the moving contacts 44 are stepped successively on the stationary contacts in the reverse order. The contacts 46 rotate with the shaft 50 when the stepping switch is stepped to its various positions and serve to prevent rotation of the stepping switch beyond position "8" in the "up" direction and beyond position "0" in the "down" direction in a manner to be described hereinafter.

Turning now to FIGURE 2, it will be seen that each of the "pump" wafers 26, 28, 30, 32, 34 and 36 is respectively associated with a pump energization relay 52, 54, 56, 58, 60 and 62 for controlling the actuation of each of the pumps of the pumping station by respectively closing, when energized, the switches 65, 66, 68, 70, 72 and 74 in the pump starter or energization circuits. In order to facilitate the energization of the proper pump for each position of the stepping switch, each of contacts 1, 2, 3, 4, 5, 6, 7 and 8 of each of the "pump" wafers is connected through a program selector switch 64 to the pump relay associated with its respective switch wafer. When a moving contact 44 of a "pump" wafer engages a stationary contact of the "pump" wafer which is connected to a closed program selector switch 64, a circuit between the sides 76 and 78 of an A.C. line will be completed through the pump relay associated with that wafer, thus energizing the pump relay.

FIGURE 5 shows the circuit of one of the "pump" wafers 26 in more detail. It will be seen from this figure that the movable contact 44 comprises an arm which engages one of the stationary contacts of the wafer. If desired, an indicating circuit comprising a resistor 75 and a glow lamp 77 may be connected in parallel with the pump relay 52 to indicate when the pump relay 52 is energized. Also, a manual switch 67 may be connected across the contact 65 of the pump relay so that the pump associated with this relay may be manually energized.

The manner in which a plurality of pumps may be energized in proper predetermined sequence and combination by the stepping switch and program selector switches will best be understood by reference to the chart in FIGURE 3 in which the switch position columns correspond to the positions of the stepping switch, the pump rows 1, 2, 3, 4, 5, 6 correspond to the pumps associated with "pump" wafers 26, 28, 30, 32, 34 and 36, and an "X" indicates a closed selector switch 64. (The switches 64 in FIGURE 2 are closed in the same arrangement as shown in the chart of FIGURE 3.) Thus, when the stepping switch is in the "0" position, none of the pump energization relays will be energized. When, however, the stepping switch reaches the "1" position, the pump energization relay 52 corresponding to the first pump wafer 26 will become energized to close the switch 65 in the pump starting circuit of Pump #1. Likewise, when the stepping switch is in position "2," only Pump #2 corresponding to switch wafer 28 will become actuated upon closing of switch 66. For position "3" of the stepping switch, Pumps #1 and #2 corresponding to wafers 26 and 28 will be energized. For position "4," the Pump #3 corresponding to pump wafer 30 will be energized, and so on as shown in the chart. Thus, it will be apparent that by closing predetermined ones of switches 64 different combinations of pumps will become energized for each position of the stepping switch.

The manner in which stepping switch 24 is controlled will best be understood by again referring to FIGURE 4. As shown in this figure, the controller comprises an "up" time delay relay K which comprises a relay winding 80, normally closed contacts 82, and normally open contacts 84 and a "down" time delay relay L which comprises a relay winding 86, normally closed contacts 88, and normally open contacts 90. When the coils of relays K and L are energized the contacts will transfer and remain transferred as long as the coil remains energized. When the coils are de-energized, the time delay period commences and the contacts will not return to their normal position until the end of the time delay period. The relays K and L are preferably adjustable, and the delay will normally be set between 15 and 30 seconds.

Actuation of "up" time delay relay K is controlled by the closing of one of a pair of low pressure limit switches 92 and 94, and actuation of "down" time delay relay L is controlled by the closing of one of a pair of high pressure limit switches 96 and 98. The pressure limit switches are coupled to the output line 20 of the fluid distribution system and may be any known type of switch which closes in response to a given pressure, the low pressure limit switches remaining open for all pressures above the low pressure limit and the high pressure limit switches remaining open for all pressures below the high pressure limit. It is to be understood that the switches 92 and 96 may be replaced by a single pressure switch arranged to close a first circuit at a low pressure limit and a second circuit at a high pressure limit. Likewise, switches 94 and 98 may be replaced by a single switch set to close circuits at a different set of low and high pressure limits. Only one of the low limit pressure switches 92 and 94 and only one of the high limit pressure switches 96 and 98 are connected in the circuit at any one time as governed by the position of switch-over switches 99 and 100 for low and high flow conditions, respectively, in a manner to be explained. The low pressure limit switch 92 and the high pressure limit switch 96 thus form a set of low flow limit switches and the low pressure limit switch 94 and high pressure limit switch 98 form a set of high flow limit switches. If desired, the "up" time delay relay K may be actuated by closing the "up" test switch 102, which is in shunt with switches 92 and 94, and the "down" time delay relay L may be actuated by closing the "down" test switch 104 which is connected in parallel with switches 96 and 98. It will be observed that the winding 80 of time delay relay K is connected across A.C. line 76–78 through the normally closed contacts 82 of relay K and 88 of relay L and one of the low pressure limit switches 92 and 94 or, in a testing situation, through test switch 102. Likewise, the winding 86 of time delay relay L is connected across line 76–78 through the normally closed contacts 82 of relay K and 88 of relay L and one of the high pressure limit switches 96 and 98 or, in a testing situation, through test switch 104.

The stepping switch 24 is driven in the "up" direction upon energization drive means in the form of an "up" solenoid 106. Similarly, a "down" solenoid 108 provides a second drive means that drives the rotary stepping switch 24 in the opposite or "down" direction. In order to energize the solenoids, a direct current supply must be provided. To this end, a rectifier bridge 110 is connected across the A.C. line 76–78. The output terminals of the rectifier bridge 110 are connected to a resistance-capacitance smoothing filter comprising a series resistor 112 and a shunt capacitor 114, thus providing a direct current voltage across a pair of terminals 116 and 118. The circuit of solenoid 106 is completed from terminal 116 through the normally open contacts 84 of time delay relay K, through the "stop" wafer 42 of stepping switch 24, through a normally closed interruptor switch 120, and thence through solenoid 106 to terminal 118. Thus, when contacts 84 are closed, solenoid 106 will become energized. This will cause the armature (not shown) of the solenoid to engage a ratchet (not shown) connected to the shaft 50 of stepping switch 24 to rotate the shaft through one position in the "up" direction. The solenoid will, at the same time, rotate a cam (not shown) which will open the interruptor contacts 120 when this rotation is almost completed. The solenoid will then remain energized through a holding resistor 122 which is connected in parallel with the interruptor contacts 120. It is to be understood that the current through the holding resistor 122 is normally not sufficient to operate solenoid 106 but is sufficient to hold it in its operated condition. When contacts 84 open, the voltage to the holding resistor 122 will be removed. The solenoid will then return to its de-energized position counter-rotating the cam to allow the interruptor contacts 120 to return to their normally closed position and retracting the armature of the solenoid from the ratchet. A series circuit including a resistor 124 and a capacitor 126 is connected between terminal 116 and the upper terminal of solenoid 106.

In like manner, the circuit of "down" solenoid 108 is completed from terminal 116 to terminal 118 through normally open contacts 90 of time delay relay L, stop wafer 40, and normally closed interruptor contacts 128. When contacts 90 close, solenoid 108 becomes energized causing its armature (not shown) to engage a second ratchet (not shown) on shaft 50 to rotate the shaft through one position in the opposite or "down" direction and causing rotation of a second cam (not shown) to open contacts 128. As in the case of solenoid 106, solenoid 108 is provided with a holding circuit comprising a resistor 130 and a series circuit comprising a resistor 132 and a capacitor 134 connected from terminal 116 to the upper terminal of solenoid 108. When contacts 90 open, solenoid 108 will become de-energized, counter-rotating the second cam to allow contacts 128 to close and retracting its armature from the second ratchet.

The "stop" wafers 40 and 42 are provided for preventing rotation of the stepping switch 24 beyond a predetermined position in each direction. To this end, the annular moving contact 46 of "stop" wafer 40 is provided with a notch 138 so located that it will become aligned with a fixed contact 140 at the "0" position of the stepping switch. In this way, when the stepping switch is at the "0" position the circuit to the "down" solenoid 108 cannot be completed through fixed terminal 140 and annular contact 46 of "stop" wafer 40. Similarly, the annular moving contact 46 of "stop" wafer 42 is provided with a notch 142 so positioned that it will open the circuit to a fixed contact 144 when the stepping switch reaches the "8" position, thus preventing actuation of solenoid 106.

The manner in which the solenoids 106 and 108 operate to step the stepping switch 24 to a position suitable for providing a proper pressure in the output line 20 will now be described. Assume, first, that the stepping switch is in the "0" position (the position shown in FIGURE 4). In this position, none of the pump relays 52, 54, 56, 58, 60 and 62 will be energized, and none of the pumps associated with these relays would be running. When the water pressure in the ouput line 20 of the fluid distribution system drops to the point set by the low limit pressure switch 92, it would close its contacts completing the circuit to "up" time delay relay K from side 76 of the A.C. line through normally closed contacts 82 of relay K, normally closed contacts 88 of relay L, low limit pressure switch 92, switch-over switch 99, winding 80 of relay K to the other side 78 of the A.C. line. When relay K is thus energized, it will cause normally closed contact 82 to open and will close normally open contact 84. Since relay K is normally energized through its own normally closed contact 82, it will be immediately de-energized and begin its time delay action. It is to be noted, also, that during this time delay action, the "down" time delay relay L cannot be energized because of the open contact 82 of relay K. The normally open contacts 84 of relay K, which are now closed, will connect the D.C. voltage from terminal 116 through fixed contact 144 of "stop" wafer 42, annular contact 46 of the "stop" wafer, the closed contacts of interruptor 120, and solenoid 106 to the other side 118 of the D.C. supply. The "up" solenoid 106 will thus be energized, causing the solenoid to rotate the shaft 50 and step moving contact 44 of the "pump" wafers and the "position" wafers 38 and 46 of the "stop" wafers 42 and 40 through one position. When the solenoid 106 almost completes this rotation, the interruptor contact 120 will open; but the solenoid will remain in its rotated (energized) position by virtue of the current through the holding resistor 122. The solenoid 106 will remain energized until the contacts of "up" time delay relay K return to their normal position at the end of the time delay period. The switch arms 44 will remain in position "1."

In the event that one of the program selector switches 64 connected to a fixed contact corresponding to position "1" is closed, the pump associated with that selector switch will become energized. Thus, in the example given in FIGURES 2 and 3, pump #1 associated with pump wafer 26 will become energized upon closing of switch 65 in its pump starting circuit. If this pump was not of sufficient capacity to boost the water pressure high enough, the low limit pressure switch 92 would remain closed. This would cause relay K to again be energized, as described above, as soon as its previous time delay period was completed, thus stepping the rotary stepping switch 24 to position "2." It will similarly step up to position "8," if the low limit pressure switch in the circuit continues to remain closed. The stepping switch is prevented from rotating past position "8" by the action of the notch 142 which will open the circuit to the solenoid 106 when the stepping switch reaches this position. In each position of the stepping switch, different combinations of pumps will be energized as selected by the selector switches corresponding to that position. Thus, any combination of pumps may be previously selected and turned on in any particular position of the stepping switch. Normal operation of the controller would dictate that as the stepping switch advances from position "1" to position "8," a pump, or combination of pumps, having greater total output capacity would be selected.

When the water pressure builds up to a point which closes the high limit pressure switch 96 or 98 (depending upon which one is connected in the circuit by switch-over switch 100), the "down" time delay relay L will operate causing the "down" solenoid 108 to be energized and stepping switch 24 down one position toward the "0" position. As with the stepping of the stepping switch 24 in the "up" direction, the stepping switch will be repeatedly stepped "down" until the high limit pressure switch in the circuit (96 or 98) opens.

Under normal operation, the program selector switches 64 would be programmed so that the higher the position of the stepping switch 24, the greater would be the total pumping capacity. The controller would thus automatically regulate the system water pressure, maintaining it within the limit set by the low and high pressure switches for any water demand up to the maximum capacity of the pumps in the system. By analyzing the individual pump characteristics, a program can be selected which will run those pumps or combination of pumps which will give the maximum efficiency for a particular demand. The addition of pumps to the system can be readily accommodated by properly programming the selector switches. Seasonal or other demand conditions can also be readily accommodated due to the flexibility of the controller.

The switch-over circuit for controlling switch-over switches 99 and 100 will now be described with particular reference to FIGURE 6, in which the letters A, B, C, D, and E correspond to the points in the schematic of FIGURE 4 having the same letter designations. As seen in this figure, the switch-over circuit comprises a latching relay having a first winding 150 and a second winding 152 controlling single pole, double throw switches 99, 100, 153, 154 and 156. A switch-over position selector switch 160 having a first switch wafer 162 and a second switch wafer 164 ganged by a common shaft 166 is provided for selecting the position at which switch-over from one set of pressure limit switches to the other set of pressure limit switches occurs. Each of the wafers 162 and 164 of the switch 160 is provided with a plurality of fixed contacts 2, 3, 4, 5, 6, 7, and 8, corresponding to the positions of the same number of stepping switch 24, and a movable contact arm 168. It will be observed that the contacts 2 through 8 of wafer 162 are respectively connected to the corresponding contacts 2 through 8 of "position" wafer 38 of stepping switch 24, while the contacts 2 through 8 of wafer 164 are respectively connected to the contacts 1 through 7 of "position" wafer 38. (These connections between wafers 162 and 164 and wafer 38 are not shown in FIGURE 4.) The switch 99 selects one of the lower limit pressure switches 92 or 94; the switch 100 selects one of the upper limit pressure switches 96 and 98; the switch 153 normaly closes the circuit to winding 150 of the latching relay; the switch 154 normally opens the circuit to winding 152 of the latching relay; and switch 156 energizes one of a pair of indicator lamps 170 and 172 through a pair of respective resistors 174 and 176 to indicate whether the low flow limit switches 92 and 96 or the high flow limit switches 94 and 98 are connected in the circuit of the controller.

The operation of the switch-over circuit will now be described. Assuming, as shown in FIGURE 6, that it is desired to switch-over from the low flow limit switches to the high flow limit switches when the stepping switch reaches position "4," the switch 160 is set with the moving contacts 168 connected to the fixed contacts 4 of each of the wafers 162 and 164. Thus, when stepping switch 24 reaches position "4," the circuit through winding 150 of the latching relay will be completed from the line 78 of the A.C. supply through the normally closed contacts of switch 153, switch wafer 162, and "position" wafer 38 to side 76 of the A.C. line. The winding 150 is thus energized and reverses the connections of switches 99, 100, 153, 154 and 156 and keeps them reversed by virtue of its latching action. Thus, when stepping switch 24 steps to positions beyond position "4" the contacts of the latching relay will remain reversed and the high flow limit switches will remain in the circuit. However, when the stepping switch steps "down" to position "3," a circuit will be completed through winding 152 of the latching relay from the side 78 of the A.C. line through switch 154 which is now closed, switch wafer 164, and "position" wafer 38, fixed contact 3 of which is now connected to moving contact 44, to side 76 of the A.C. line. Winding 152 is thus energized and reverses the positions of the switches 99, 100, 153, 154 and 156 of the latching relay to their original position unlatching the relay. In this way, the low flow limit switches 92 and 96 will again be connected in the circuit of the controller.

It will be noted from FIGURE 6 that the position wafer 38 also controls the energization of a group of indicator lamp circuits 180. Each of the lamp circuits comprises a resistor 184 and a glow lamp 182 connected to one of the stationary contacts of switch wafer 38, including the contact 0 corresponding to the "0" position. The circuit through the indicator lamps may be traced from side 76 of the A.C. line through "position" wafer 38, resistors 184, and glow lamps 182 to side 78 of the A.C. line. Thus, at each position of stepping switch 24 one of the glow lamps 182 will be energized to indicate the position of the stepping switch.

While a preferred embodiment of the invention has been shown and described, it will be apparent to those skilled in the art that changes can be made without departing from the principles and spirit of the invention, the scope of which is defined in the appended claims. Accordingly, the foregoing embodiment is to be considered illustrative, rather than restrictive of the invention, and those modifications which come within the meaning and range of the equivalency of the claims to be included therein.

The invention claimed is:

1. An automatic controller for a system including a plurality of circuits operative when energized to alter a condition existing in said system, comprising a bi-directional stepping switch movable into a selected one of different positions, said stepping switch having a plurality of switch sections, one for each circuit, each of said switch sections having a plurality of switch contacts at said different positions of said stepping switch; drive means for selectively moving all sections of said switch simultaneously to a selected one of said different positions to connect predetermined ones of said switch contacts to the circuit associated with its respective switch section, whereby predetermined combinations of said circuits will be energized at said different positions of said stepping switch; means sensing said condition in the system and means responsive to said sensing means for stepping said stepping switch to select one of said predetermined combinations.

2. An automatic motor controller for a system having a plurality of motors operative, when energized, to affect a condition of said system, each of said motors having a motor energizing means, comprising: a bi-directional stepping switch movable into a selected one of different positions, said stepping switch having a plurality of switch sections, one for each motor energizing means, each of said switch sections having a plurality of switch contacts at different positions of said stepping switch; means for selectively moving all sections of said switch simultaneously to a selected one of said different positions to connect predetermined ones of said switch contacts to the motor energizing means associated with its respective switch section, whereby predetermined combinations of motor energizing means will be actuated at said different positions of said stepping switch; means responsive to said condition beyond a lower limit for stepping said stepping switch in a first direction; and means responsive to said condition beyond an upper limit for stepping said stepping switch in the opposite direction.

3. An automatic motor controller for a system having a plurality of motors operative, when energized, to affect a condition of said system, each of said motors having a motor energizing relay, comprising: a bi-directional stepping switch movable into a selected one of different positions, said stepping switch having a plurality of switch wafers, one for each motor energizing relay, each of said switch wafers having a plurality of switch contacts, one for each position of said stepping switch; means for selectively moving all sections of said switch simultaneously to a selected one of said different positions to connect predetermined ones of said switch contacts to the motor energizing relay associated with its respective switch wafer, whereby predetermined combinations of motor energizing relays will be actuated at each position of said stepping switch; a first circuit means operatively connected to said drive means for moving the stepping switch one position in a first direction and including switch means responsive to said system condition beyond a lower limit for energizing the drive means; and a second circuit means operatively connected to said drive means for moving the stepping switch one position in the opposite direction and including separate switch means responsive to said system condition beyond an upper limit for energizing the drive means.

4. An automatic motor controller as defined in claim 3, wherein said first circuit means responsive to said system condition beyond a lower limit also comprises first time delay relay means rendering the first circuit means inoperative for a predetermined interval of time after moving the stepping switch one position in said first direction and after said interval re-energizing said first circuit means to repeatedly step said stepping switch in said first direction until said condition exceeds said lower limit; and said second circuit means responsive to said system condition beyond an upper limit also comprises second time delay relay means rendering the second circuit means inoperative for a predetermined interval of time after moving the stepping switch one position in said opposite direction and after said interval re-energizing said second circuit means to repeatedly step said stepping switch in said opposite direction until said condition falls below said upper limit.

5. An automatic motor controller for a system having a plurality of motors operative, when energized, to affect a condition of said system, each of said motors having a motor energizing relay, comprising: a bi-directional rotary stepping switch movable into a selected one of different positions, said stepping switch having a plurality of switch wafers, one for each motor energizing relay, each of said switch wafers having a plurality of switch contacts, one for each position of said stepping switch; drive means for rotating said stepping switch to connect predetermined ones of said switch contacts to the motor energizing relay associated with its respective switch wafer, whereby predetermined combinations of motor energizing relays will be actuated at each position of said stepping switch; circuit means energizing said drive means; means responsive to said condition beyond a lower limit for stepping said stepping switch repeatedly in a first direction until said condition exceeds said lower limit; means responsive to said condition beyond an upper limit for stepping said stepping switch repeatedly in the opposite direction until said condition falls below said upper limit; means for preventing said stepping switch from stepping beyond a first predetermined position in said first direction; and means for preventing said stepping switch from stepping beyond a second predetermined position in said opposite direction.

6. An automatic motor controller as defined in claim 5, wherein said means for preventing said stepping switch from stepping beyond said first predetermined position in said first direction comprises a first "stop" switch wafer driven by said stepping switch and provided with an annular contactor in said energizing circuit for said drive means, said contactor having a notch at which said energizing circuit will open when said stepping switch reaches said first predetermined position and said means for preventing said stepping switch from stepping beyond said second predetermined position in said second direction comprises a second "stop" switch wafer driven by said stepping switch and provided with a second annular contactor in said energizing circuit for said drive means, said second contactor also having a notch at which said energizing circuit will open when said stepping switch reaches said second predetermined position.

7. An automatic controller for a fluid pumping station having a plurality of pumps of different pumping capacities for supplying fluid under pressure to a fluid distribution system, each of said pumps having a pump energizing relay, comprising: a rotary stepping switch, said stepping switch having a plurality of switch wafers, one for each pump energizing relay, each of said switch wafers having a plurality of switch contacts, one for each position of said stepping switch; switch means for connecting predetermined ones of said switch contacts to the pump energizing relay associated with its respective switch wafer, whereby predetermined combinations of pump energizing relays are actuated at each position of said stepping switch; "up" means for stepping said stepping switch in a first direction; "down" means for stepping said stepping switch in the opposite direction; first means responsive to a pressure in said fluid distribution system beyond a first lower limit, second means responsive to a pressure in said fluid distribution system beyond a first upper limit, third means responsive to a pressure in said fluid distribution system beyond a second lower limit, fourth means responsive to a pressure of said fluid distribution system beyond a second upper limit, said first and second means ordinarily being connected to control the actuation of said "up" means and said "down" means, respectively; and switch-over means responsive to said stepping switch reaching a predetermined position in said first direction for disconnecting said first means and said second means and connecting said third means and said fourth means to control actuation of said "up" means and said "down" means, respectively.

8. An automatic controller as defined in claim 7, wherein said switch-over means comprises means for maintaining said third and fourth means connected to control actuation of said "up" means and said "down" means, respectively, for all positions of said stepping switch beyond said predetermined position in said first direction and means responsive to said stepping switch reaching one position beyond said predetermined position in said opposite direction for disconnecting said third and fourth means and re-connecting said first and second means to control actuation of said "up" means and "down" means, respectively.

9. An automatic controller as defined in claim 7, wherein said switch-over means comprises a latching relay having a first winding and a second winding; a switch-over selection switch having a first switch wafer and a second switch wafer, each having a plurality of corresponding switch contacts, successive contacts of said first wafer being respectively connected to successive contacts of a switch wafer of said stepping switch and corresponding successive contacts of said second wafer being respectively connected to the preceding successive contacts of said switch wafer of said stepping switch; means for selecting a corresponding pair of contacts of said first and second wafers; means for completing a circuit through said first winding, said selected contact of said first wafer, and the corresponding successive contact of said switch wafer of said stepping switch, whereby said first winding of said latching relay will become energized upon said stepping switch reaching said corresponding successive contact of said switch wafer of said stepping switch to latch said latching relay and effect "switch-over" from said first and second means to said third and fourth means; and means for completing a circuit through said second winding, said selected contact of said second wafer, and said corresponding preceding successive contact of said switch wafer of said stepping switch, whereby said second winding of said latching relay will become energized upon said stepping switch reaching said corresponding preceding successive contact of said switch wafer of said stepping switch to unlatch said latching relay and effect switch-over from said third and fourth means to said first and second means.

10. An automatic controller as defined in claim 7, wherein said second lower limit is higher than said first lower limit and said second upper limit is higher than said first upper limit.

11. An automatic controller for a fluid distribution system having a plurality of pumps and motors, each motor energized being operable to drive a pump to change a condition existing in the fluid distribution system comprising: first means responsive to deviation of said condition of said system beyond a first set of limits; second means responsive to deviation of said condition beyond a second set of limits; selection means for actuating preselected combinations of said motors; and switch-over means for connecting said first means to control actuation of said selection means for lower rates of flow in said system and for disconnecting said first means and connecting said second means to control actuation of said selection means for rates of flow exceeding a predetermined level.

12. An automatic controller as defined in claim 11, wherein said condition is the pressure of said system.

13. An automatic controller for a fluid distribution system having a plurality of pumps and motors, each motor energized being operable to drive a pump to change a condition existing in the fluid distribution system, comprising: first means responsive to said condition of said system beyond a first lower limit; second means responsive to said condition of said system beyond a first upper limit; third means responsive to said condition of said system beyond a second lower limit; fourth means responsive to said condition of said system beyond a second upper limit; selection means for actuating preselected combinations of said motors; and switch-over means for connecting said first and second means to control actuation of said selection means for lower rates of flow to said system and for disconnecting said first and second means and connecting said third and fourth means to control actuation of said selection means for rates of flow exceeding a predetermined level.

14. An automatic controller as defined in claim 13, wherein said condition is the pressure of said system.

15. In a system of the character described, a bi-directional stepping switch; first means responsive to a first signal for stepping said stepping switch one position in a first direction; time delay means rendering said first means inoperative thereafter for a predetermined interval of time and after said interval again energizing said first means to again step said stepping switch repeatedly in said first direction in the continued presence of said signal; second means responsive to a second signal for stepping said stepping switch in the opposite direction; second time delay means rendering said second means inoperative thereafter for a predetermined interval of time and after said second mentioned interval of time again energizing said second means to again step said stepping switch repeatedly in said opposite direction in the continued presence of said second signal; and means preventing operation of said first and second means during said time delays.

16. In a system of the character described, a bi-directional stepping switch; drive means for stepping said stepping switch in a given direction; circuit means energizing said drive means; and means in said circuit means for preventing said stepping switch from stepping beyond a predetermined position in said given direction, said means comprising a fixed contact and a cooperating rotating contact driven by said stepping switch, said rotating contact being provided with a notch registerable with said fixed contact whereby the circuit to said drive means for stepping said stepping switch will open at said predetermined position.

17. An automatic motor controller for a system including a plurality of motors operative to change a condition in the system, comprising in combination: a bi-directional stepping switch having a plurality of switch sections, each energizing one of said motors; each switch section having a plurality of fixed contacts and a movable contact engageable with a selected one of the fixed contacts; means moving all of the movable contacts in unison; and individual selector switch means connected to each of the fixed contacts, and independently movable to a closed position, the individual selector switch means connected to all the contacts of each section being also connected in parallel to the motor energized by the respective section, whereby when predetermined ones of said selector switch means are closed predetermined combinations of motors can be energized at selected positions of the movable contacts of the stepping switch.

18. An automatic motor controller as in claim 17 in which the individual selector switch means can be manually preset individually to open or closed positions to determine the combinations of motors energized at any selected position of the movable contacts.

19. An automatic motor controller as in claim 17 in which a different combination of motors is energized at each of the several positions of the stepping switch, except at one position at which no motors are energized.

20. An automatic controller for a fluid distribution system, comprising in combination:
a bi-directional stepping switch;
sensing means generating a signal in response to a condition existing in the system;
means responsive to said signal stepping said switch one step at a time; and
time delay means rendering the last mentioned means inoperative thereafter for a predetermined interval of time and after said interval restoring to operative condition the means responsive to said signal to step the switch.

References Cited by the Examiner

UNITED STATES PATENTS

| 2,634,376 | 4/1953 | Eck | 317—139 X |
| 2,741,986 | 4/1956 | Smith | 103—11 |
| 2,778,981 | 1/1957 | Singleton | 317—140 X |
| 2,803,192 | 8/1957 | Crabtree | 103—11 |
| 2,888,875 | 6/1959 | Buck | 103—11 |
| 2,963,590 | 12/1960 | Schultz et al. | 307—41 |
| 2,968,746 | 1/1961 | Flan et al. | 317—139 |
| 3,005,411 | 10/1961 | Metz | 103—11 |
| 3,013,248 | 12/1961 | Carbonara et al. | 317—134 X |
| 3,025,496 | 3/1962 | Schmid et al. | 317—137 X |
| 3,036,229 | 5/1962 | Kemp et al. | 317—137 X |
| 3,119,021 | 1/1964 | Podell et al. | 307—39 |
| 3,160,101 | 12/1964 | Bartoseski et al. | 103—11 |

LAURENCE V. EFNER, *Primary Examiner.*